United States Patent
Antao et al.

(10) Patent No.: US 9,187,079 B2
(45) Date of Patent: Nov. 17, 2015

(54) RETARDING SYSTEM FOR AN ELECTRIC DRIVE MACHINE

(71) Applicant: Caterpillar Inc., Peoria, IL (US)

(72) Inventors: Nischol Antao, Peoria, IL (US); Michael Staub, Metamora, IL (US); Bradley Bailey, Peoria, IL (US); Bryan Copeland, Bartonville, IL (US); Harold Dabbs, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 156 days.

(21) Appl. No.: 13/929,859

(22) Filed: Jun. 28, 2013

(65) Prior Publication Data

US 2015/0001914 A1    Jan. 1, 2015

(51) Int. Cl.
| | |
|---|---|
| B60T 13/66 | (2006.01) |
| B60W 10/08 | (2006.01) |
| B60W 30/18 | (2012.01) |
| B60W 10/196 | (2012.01) |
| B60W 10/188 | (2012.01) |
| B60T 7/04 | (2006.01) |

(52) U.S. Cl.
CPC .............. B60W 10/08 (2013.01); B60T 7/042 (2013.01); B60W 10/188 (2013.01); B60W 10/196 (2013.01); B60W 30/18109 (2013.01); *Y10T 74/20528* (2015.01)

(58) Field of Classification Search
USPC ...... 188/2 A, 112 A, 162; 303/2, 13, 15, 152; 180/54.1, 65.25, 65.31; 74/512; 701/48
See application file for complete search history.

(56) References Cited

U.S. PATENT DOCUMENTS

| | | | |
|---|---|---|---|
| 4,002,373 A | 1/1977 | Mori | |
| 4,553,650 A | 11/1985 | Warwick et al. | |
| 6,202,018 B1* | 3/2001 | Stumpe et al. | 701/70 |
| 6,431,661 B1 | 8/2002 | Meyer | |
| 6,591,711 B2 | 7/2003 | Porter et al. | |
| 6,910,747 B2 | 6/2005 | Tsunehara | |
| 7,439,695 B2 | 10/2008 | Ngo et al. | |
| 8,893,845 B2* | 11/2014 | Stilwell et al. | 180/370 |
| 2005/0269871 A1* | 12/2005 | Saito | 303/20 |
| 2006/0071545 A1* | 4/2006 | Young et al. | 303/115.1 |
| 2008/0306667 A1* | 12/2008 | Karnjate et al. | 701/70 |
| 2008/0309155 A1* | 12/2008 | Audrezet et al. | 303/15 |
| 2009/0240412 A1* | 9/2009 | Cahill | 701/70 |
| 2010/0025167 A1* | 2/2010 | Staub et al. | 188/156 |
| 2013/0233118 A1* | 9/2013 | Khan et al. | 74/514 |

FOREIGN PATENT DOCUMENTS

| | | |
|---|---|---|
| EP | 1963156 | 9/2008 |
| JP | 2007106270 | 4/2007 |

* cited by examiner

*Primary Examiner* — Christopher Schwartz
(74) *Attorney, Agent, or Firm* — Glenn Waterfield

(57) ABSTRACT

A retarding system for an electric drive machine is provided. The retarding system includes an electrical retarding system and a hydraulic braking system. A single pedal controls both the electrical retarding system and the hydraulic braking system. The pedal includes a first range of travel that provides input to the electrical retarding system and a second range of travel that additionally controls the hydraulic braking system. The pedal further includes different levels of travel resistance in each of the two ranges of travel that correspond to providing inputs to the electrical retarding system and the hydraulic braking system.

5 Claims, 6 Drawing Sheets

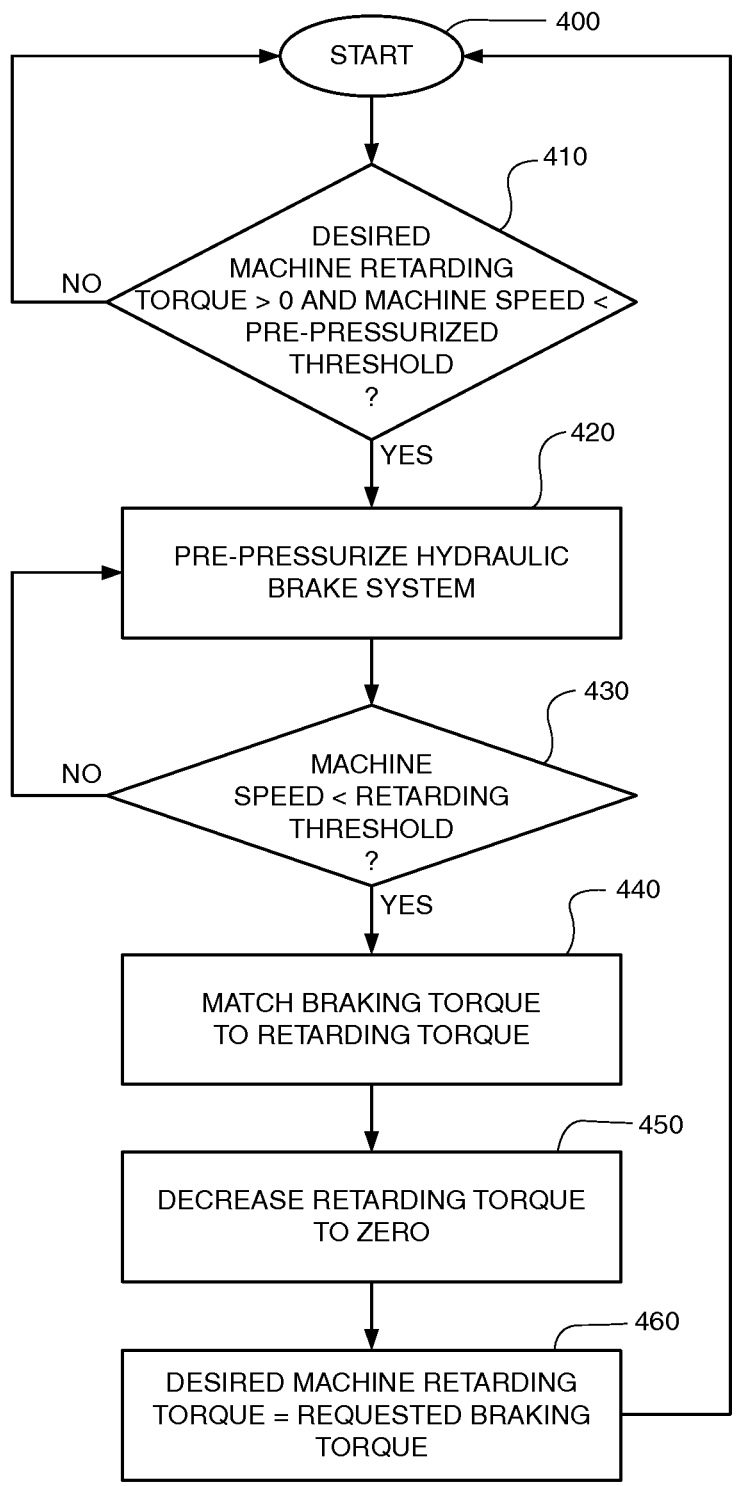

RETARDING SYSTEM FOR AN ELECTRIC DRIVE MACHINE

TECHNICAL FIELD

This disclosure relates generally to braking systems, and, more particularly to braking systems and methods that combine electric retarding and friction braking to slow a machine.

BACKGROUND

Braking systems are used in a large variety of machines and vehicles to control, slow and stop the machine. Exemplary machines include passenger vehicles, trains, dump trucks, and mining vehicles. Machines increasingly use electric drive systems to provide propulsion for the machine. For example, passenger vehicles may use a hybrid drive system whereby a traditional gasoline powered engine and an electric motor are both used to provide propulsion for the vehicle. Machines, such as a railway engines and off-road vehicles may use a diesel-powered engine to drive a generator, which provides electric power to a motor. The motor then provides propulsion for the machine.

Braking systems may take advantage of components in electric drive systems to provide braking for machines. For example, a hybrid passenger vehicle may include a regenerative braking system whereby the vehicle is slowed by the electric drive system while at the same time a battery in the vehicle is recharged. Railway engines use dynamic retarding to slow the train. Although brake systems utilizing electric drive systems have been used, these systems cannot stop a machine traveling at high speed quickly, nor can these systems consistently slow a heavily loaded machine traveling downhill or in slippery conditions.

Some prior systems include a manual retarder lever that enables the operator to control ground speed by manually selecting the level of retarding or automatic retarder control that automatically controls machine speed based the operator's machine speed setting. The manual or automatic retarder may control an electric retarding system. Additionally, the operator may control a traditional braking pedal to actuate hydraulic brakes. In this way, the operator can manually control both dynamic retarding and hydraulic brakes. However, this configuration may be difficult for an operator to control effectively. For example, if the speed setting lever is set to high, the operator may have to rely more on the service brakes. In a large, heavily loaded machine, this may lead to the service brakes overheating. In addition, excess service brake wear may occur on a machine if the service brakes are used for continuous retarding.

U.S. Pat. No. 20090,179,486 to Ikeda et al., issued Jul. 16, 2009, entitled "BRAKE SYSTEM IN ELECTRIC DRIVE DUMP TRUCK," discloses a brake system in an electric drive dump truck having a hydraulic brake and a generator-type retarder operated by a brake pedal. However, the Ikeda reference does not disclose how to provide feedback to the truck's operator when the brake system transitions between hydraulic function and retarder function. Nor does the Ikeda reference discuss how the brake system manages the transition between hydraulic braking and retarder operation when the retarder is not available.

SUMMARY OF THE INVENTION

In one aspect of the current disclosure, a retarding system for a machine having an electric drive system powering a set of rear wheels is disclosed. The retarding system comprises an electrical retarding system associated with the electric drive system and configured to supply a retarding torque to the rear wheels in response to a requested retarding torque, a hydraulic brake system configured to supply a braking torque to a set of wheels in response to a requested braking torque, a brake pedal having a total range of travel comprising a first range of travel and a second range of travel, and an encoder configured to provide an output to the retarding system proportional to the total range of travel. The first range of travel is associated with a first level of travel resistance and is configured to provide a requested retarding torque in response to the output and the second range of travel is associated with a second level of travel resistance and is configured to provide a requested braking torque and a requested retarding torque in response to the output.

In another aspect of the current disclosure, a method for retarding a machine having an electric drive system powering a set of rear wheels, an electrical retarding system associated with the electric drive system and configured to supply a retarding torque to the rear wheels in response to a requested retarding torque, a hydraulic brake system configured to supply a braking torque to a set of wheels, is disclosed. The method comprises receiving an output from a brake pedal having a total range of travel comprising a first range of travel and a second range of travel, supplying a retarding torque in response to an output corresponding to the first range of travel that is associated with a first level of travel resistance and supplying a braking torque and a requested retarding torque in response to an output corresponding to the second range of travel that is associated with a second level of travel resistance.

In another aspect of the current disclosure, a pedal for providing inputs to two different machine retarding systems is disclosed. The pedal comprises a base, a pedal portion pivotally attached to the base and having a total range of travel, an encoder configured to provide an electrical signal corresponding to an angle between the base and the pedal portion, a first spring operably connected between the base and the pedal portion and having a first spring constant, and a second spring operably connected between the base and the pedal during a portion of the total range of travel and having a second spring constant.

BRIEF DESCRIPTION OF THE DRAWINGS

FIG. 8 is a flow chart depicting a process for implementing blended braking torque according to the current disclosure.

DETAILED DESCRIPTION

Figure 1:
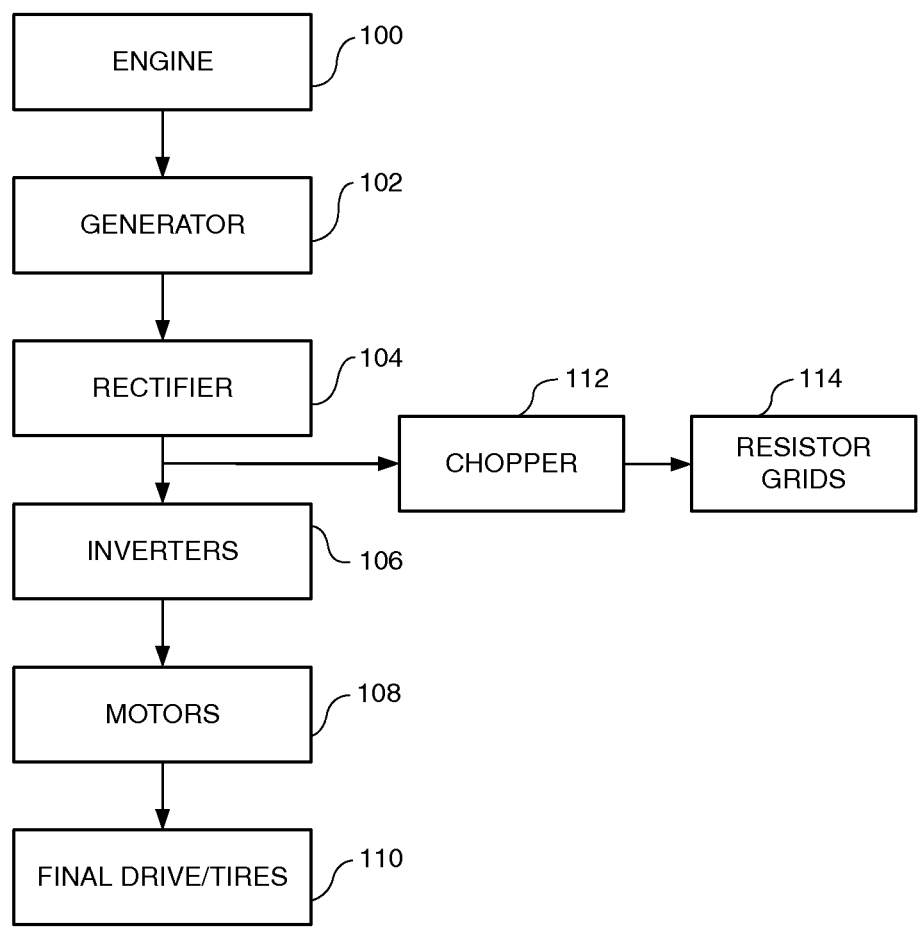
FIG. 1 is a diagrammatic view of an electric drive system for use with the current disclosure.

Referring to the drawings, FIG. 1 illustrates a schematic view of an exemplary electric drive system including an electric retarding system for a machine. The exemplary electric drive system includes an engine 100. Suitable engines include gasoline powered and diesel powered internal combustion engines. When in a drive configuration, the engine 100 powers a generator 102. The generator 102 produces three-phase alternating current. The three-phase alternating current passes through a rectifier 104, which converts the alternating current to direct current. An inverter or inverters 106 convert the direct current to variable frequency back to alternating current which feeds a motor 108. By controlling the frequency of the current produced by the inverters 106, the speed of the motor 108 is controlled. The motor 108 produces torque which powers the drive wheels 110.

In an alternative example of the current disclosure, an engine is not needed and the motor 108 is driven directly from an electric power source, such as a battery. In some example of the current disclosures, one motor powers all drive wheels. In alternative example of the current disclosure, various numbers of motors are used to power drive wheels. For example, each drive wheel may have an individual motor associated with the wheel.

When operating in an electric braking, also known as electric retarding, configuration, the drive wheels 110 power the motor 108. Driving the motor 108 places a torque on the drive wheels 110 and causes them to slow, thus braking the machine. The motors 108 generate alternating current. The inverters 106 convert the alternating current to direct current and feed the current to a chopper 112, which acts as a direct current to direct current converter, and resistor grid 114. The power generated by the motors 108 is thus dissipated thru heat by the resistor grid 114. However, in an alternative example of the current disclosure, the power generated by the motors 108 is stored for later use. In one example of the current disclosure, the power generated by the motors 108 is stored in an electric battery. The energy in the electric battery can then be used in drive mode to power the motors 108 and propel the machine.

The braking system operates in two modes. In first mode, the electric retarding system 130 supplies retarding torque 240. In a second mode, the electric retarding system supplies maximum retarding torque 240, while the hydraulic brake system 142 provides braking torque 250.

Figure 2:
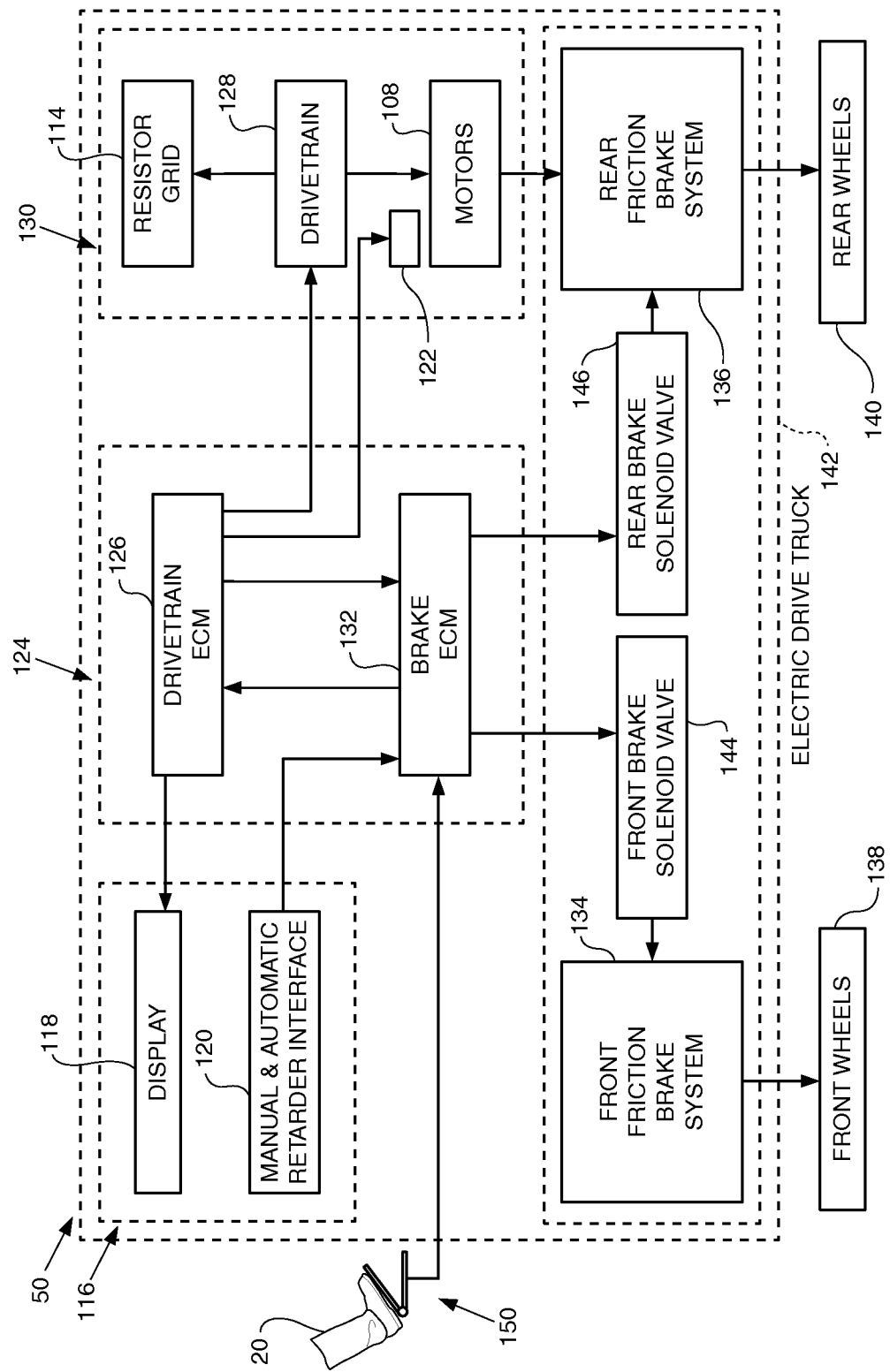
FIG. 2 is a diagrammatic view of a retarding system for use with the current disclosure.

Turning to FIG. 2, a block diagram illustrating a braking system for a machine including a hydraulic brake system 142 and an electric retarding system 130 is illustrated. In one example of the current disclosures, a user interface 116 allows the operator of the machine to view status information relating to the braking system on a display 118. Displayed information may include whether the electric retarding capacity has been exceeded. Additionally, status information regarding whether a front brake enable selection is set, automatic retarding settings and manual retarding settings may be shown on the display 118.

A speed sensor 122 is operably connected to receive information regarding the ground speed of the machine 10. The speed sensor 122 may be connected to a motor 180, front wheels 138, or rear wheels 140. The speed sensor 122 maybe connected to either drivetrain ECM 126 or the brake ECM 132.

The user interface 116 includes a manual and automatic retarder interface 120. The user interface 116 interacts with a controller 124. The controller 124 may include one or more control modules. In the illustrated example of the current disclosure, two electronic control modules (ECM) are used to implement the controller 124. The drivetrain ECM 126 controls elements in the drivetrain 128. The drivetrain 128 includes the engine 100, generator 102, rectifier 104, inverters 106, motor 108, and chopper 112. When braking the machine, the electric retarding system 130 includes the rectifier 104, inverters 106, motor 108, and chopper 112 and the resistor grid 114. In electric retarding mode, the drivetrain ECM 126 commands the electric retarding system 130 to provide a requested desired machine retarding torque and a ratio of retarding torque splits between sets of wheels. Thus, the drivetrain ECM 126 may command the machine to apply the proper ratio of torque splits between, for example a set of front wheels and a set of rear wheels.

In one example of the current disclosure, the drivetrain ECM 126 receives signals indicating the front brake retarding enable switch 122 status, the manual retarder torque setting and the auto retarder torque setting from a brake ECM 132. Based on these signals, the drivetrain ECM 126 calculates the desired machine retarding torque to be applied to the machine. The drivetrain ECM 126 provides signals indicating the desired machine retarding torque and the requested electric retarding torque to the brake ECM 132. The brake ECM, based on these signals, determines whether the requested electric retarding torque is sufficient to provide the full desired machine retarding torque. If additional braking is necessary to meet the desired machine retarding torque, the brake ECM requests a ratio of additional braking torque from the front friction brake system 134 and the rear friction brake system 136. The front friction brake system 134 connects to a front set of wheels 138 and the rear friction brake system 136 connects to a set of rear wheels 140. In one example of the current disclosure the front friction brake system 134 and the rear friction brake system 136 are part of a hydraulic brake system 142. In one example of the current disclosure, the hydraulic brake system includes a front brake solenoid valve 144 for controlling the flow of hydraulic fluid to the front friction brake system 134. Likewise, a rear brake solenoid valve 146 controls the pressure of hydraulic fluid to the rear friction brake system 136. The front friction brake system 134 and rear friction brake system 136 each include a hydraulic brake piston 148 that applies hydraulic force to actuate said brakes.

In another example of the current disclosure, a single brake solenoid valve may control both the front and rear friction brake systems 134, 136. In yet another example of the current disclosure, only the rear brake solenoid valve 146 may be present.

Figure 3:
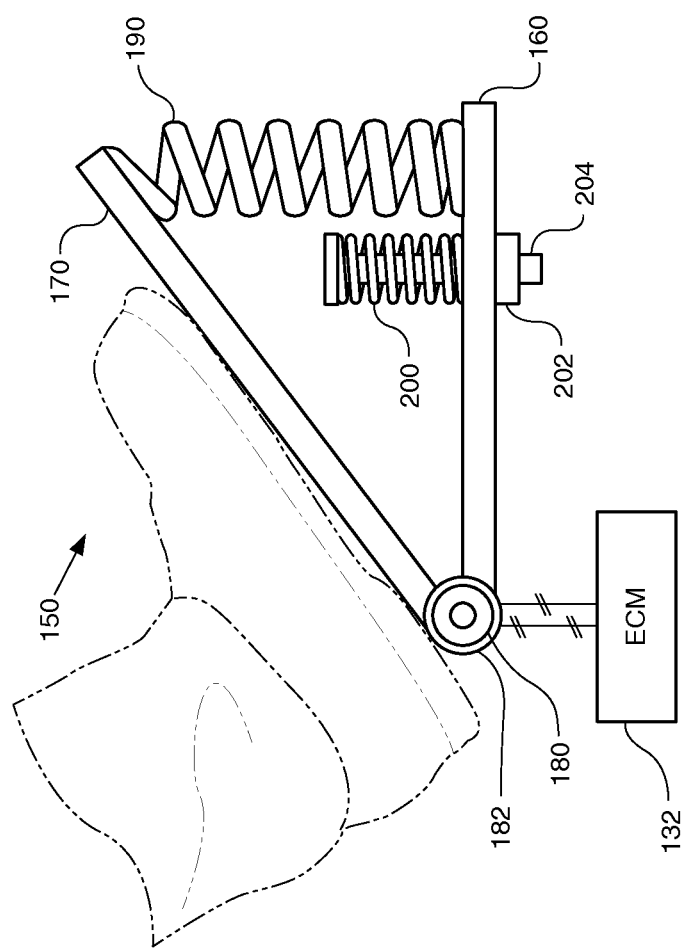
FIG. 3 is a diagrammatic view of a retarding pedal for use with the current disclosure.

Turning to FIG. 3, a brake pedal 150 includes a pedal portion 170 pivotally attached to a base 160. The pedal portion 170 is designed to pivot when depressed by an operator's foot. The degree of depression is measured by an encoder 180. The encoder 180 is configured to indicate angular position by sending an electrical signal to an ECM, such as a brake ECM 132. The brake ECM 132 measures the electrical signal, and compares it to certain parameters to determine its validity, then to other parameters to calculate the measured angular position. The encoder 180 may be of the optical type. Various such encoders 180 are known in the art. The output of the encoder 180 may be a pulse-width modulated (PWM) signal as is known in the art. The output may be expressed as a percentage of the duty cycle of the output signal, from 0 to 100%. In one alternative of the current disclosure, a second encoder 182 may be included for redundancy. The second encoder 182 may identical to the first encoder 180. The second encoder 182 is also electrically connected to an ECM, such as a brake ECM 132.

The pedal portion 170 has a total travel range 210 as it pivots on base 160. The total travel range 210 is divided into a first travel range 220 and the second travel range 230. Pivoting between the pedal portion 170 and the base 160 is resisted by force from a first spring 190 when pivoting within the first travel range 220, and an additional second spring 200 when pivoting within the second travel range 230. The first spring 190 is operably located between the pedal portion 170 and the base 160. The change in force provided by the first spring 190 is characterized by its spring constant k1 and follows Hooke's law $\Delta F1=k1*\Delta x$, where $\Delta x$ is the change in distance between base 160 and pedal portion 170 as it pivots. The change in force provided by the second spring 200 is likewise characterized by $\Delta F2=k2*\Delta x$. Therefore, the change in resisting force when the pedal portion 170 is pivoting within the second travel range 230 is given by $\Delta F1+\Delta F2$.

Figure 4:
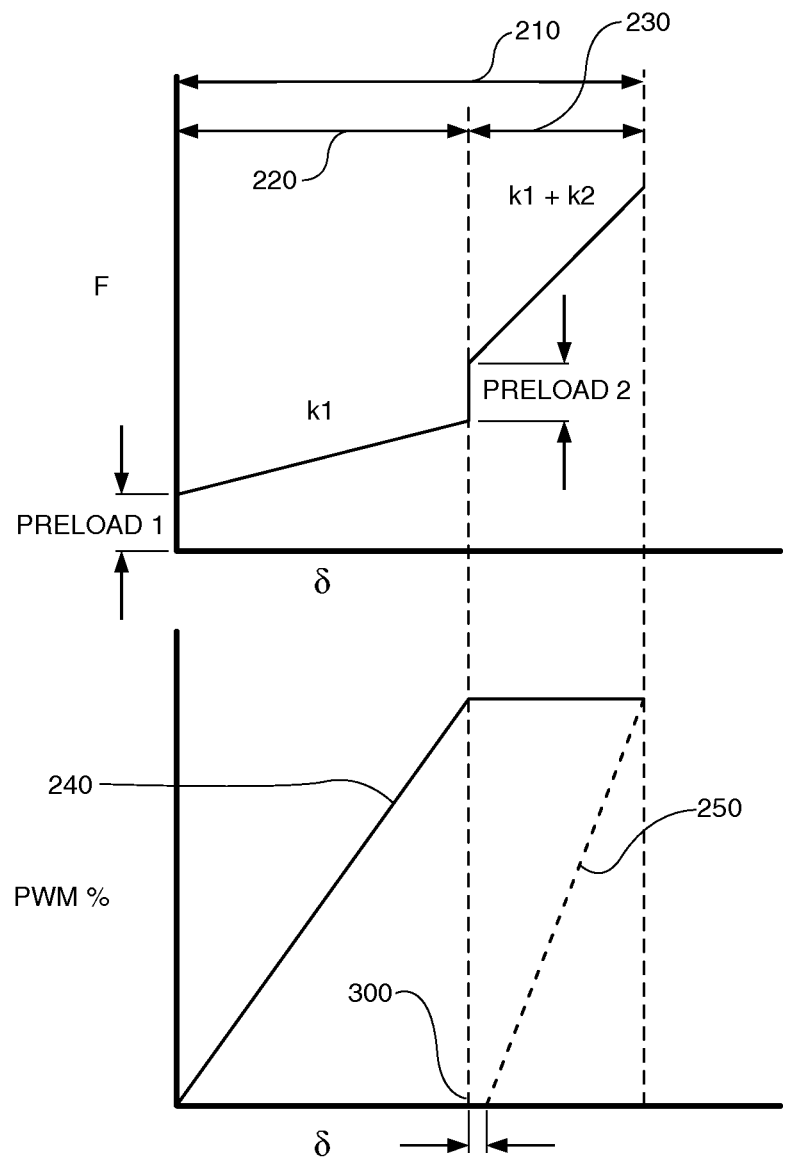
FIG. 4 is a plot illustrating the function of the retarding system according to the current disclosure.

Turning to FIG. 4, it is seen that a preload may be applied to either first spring 190 or second spring 200. The preload may be achieved by using a device that provides a degree of compression of the springs 190, 200 before they are compressed by pivoting. For instance, the length of the first spring 190 could be greater than the distance between the pedal portion 170 and the base 160. The pivot angle between the pedal portion 170 and the base 160 may be limited in order to achieve a preload. Preload on second spring 200 could be achieved by employing a mechanical stop 202 on the second spring 200. The stop 202 is configured to stop movement of a plunger 204 thereby providing a preload on second spring 200.

INDUSTRIAL APPLICABILITY

The brake pedal 150 is designed to indicate to an operator 20 of a machine 10 when the retarding system 50 is transitioning between a mode providing retarding torque 240, and a mode providing braking torque 250. The brake pedal 150 provides a greater travel resistance during the second travel range 230 than in the first travel range. The higher travel resistance is great enough to be noticed by the operator 20. The higher travel resistance is provided by the addition of the spring rate of second spring 200. FIG. 4 shows angular displacement, or pivoting, between the pedal portion 170 and the base 160 on the horizontal axis. The vertical axis on the top plot shows the force provided by the operator 20 to pivot the pedal portion 170. The vertical axis on the bottom plot shows the encoder 180 output as a percentage. When the pedal portion 170 is pivoting in the first travel range 220, the travel resistance follows the slope of k1. In the first travel range 220, the retarding system 50 is commanded to provide a retarding torque 240. When the pedal portion 170 is pivoting in the second travel range 230, the travel resistance follows the slope of k1+k2. In the second travel range 230, the retarding system 50 is commanded to provide a braking torque 250. The difference between the two spring rates during the transition between the first travel range 220 and second travel range 230 is sufficient to be noticed by an operator 20 using the brake pedal 150.

In one example of the current disclosure, the transition between the first travel range 220 and second travel range 230 may also include a preload that must be overcome before the pedal portion 170 will pivot in the second travel range 230. Refer to FIG. 4. The force needed to overcome the preload may be between 10 and 50% of the total force needed to pivot the pedal portion 170 through the second travel range 230. The force needed to overcome the preload may provide an additional indication to the operator 20 that the pedal portion 170 is transitioning to the second travel range 230 and that the retarding system 50 is entering a mode to provide braking torque 250. A preload of between 50 and 100 N may be used.

In another example of the current disclosure, the first travel range 220 may include a preload that must be overcome before the pedal portion 170 will pivot in the first travel range 220. Refer to FIG. 4. The force needed to overcome the preload may be between 10 and 50% of the total force needed to pivot the pedal portion 170 through the first travel range 220.

In another example of the current disclosure, there may be provided a dead band region 300 at the beginning of the second travel range 230 in which no braking torque 250 is commanded. The dead band region 300 prevents the operator 20 from inadvertently commanding a braking torque 250 when the pedal portion 170 is at the transition between the first travel range 220 and second travel range 230.

Figure 5:
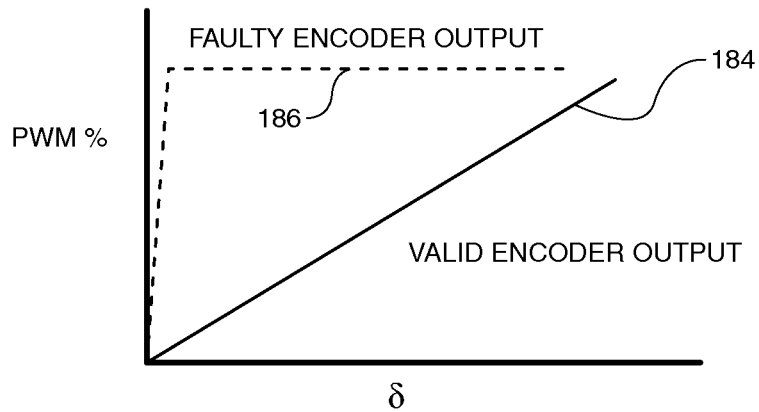
FIG. 5 is a plot illustrating a faulty encoder output according to the current disclosure.

In one example of the current disclosure, the encoder 180 and second encoder 182 are both connected to an ECM, such as a brake ECM 132. The second encoder 182 provides signal redundancy such that the brake ECM 132 always receives at least one valid signal indicating the sensed angle position between the pedal portion 170 and the base 160. The brake ECM 132 may use both signals to indicate the sensed angle position. Alternatively, it may use the signal from encoder 180 under normal conditions. The brake ECM 132 may then switch to the signal from second encoder 182 if the signal from 180 is determined to be faulty. The fault can be determined as is known in the art. As shown in FIG. 5, if a signal is determined to be faulty the brake ECM 132 will use the other, valid, signal to indicate the sensed angle position. Brake ECM 132 may send a fault signal to the drivetrain ECM 126 if a faulty encoder output is detected. The drivetrain ECM 126 may sound an audible alarm and/or display a fault message or icon on the display 118. Similarly, if the signals from encoders 180 and 182 are not determined to be faulty, but rather disagree, then a number of actions may be taken. For instance, the brake ECM 132 may switch to the minimum signal or the maximum signal depending on the application.

In another aspect of the current disclosure, the brake ECM 132 is configured to use the hydraulic brake system 142 provide braking torque 250 throughout the total travel range 210 if a failure is detected in the electric retarding system 130. For instance, if a failure such as a ground fault or open circuit is detected in the resistor grid 114, motors 108, or drivetrain 128 is detected, the drivetrain ECM 126 may send a fault signal to the brake ECM 132. The brake ECM 132 can then use the hydraulic brake system 142 to provide braking torque 250 for any pedal position within the total travel range 210. Upon detection of a failure in the electric retarding system 130, the drivetrain ECM 126 may sound an audible alarm and/or display a fault message or icon on the display 118.

Figure 6:
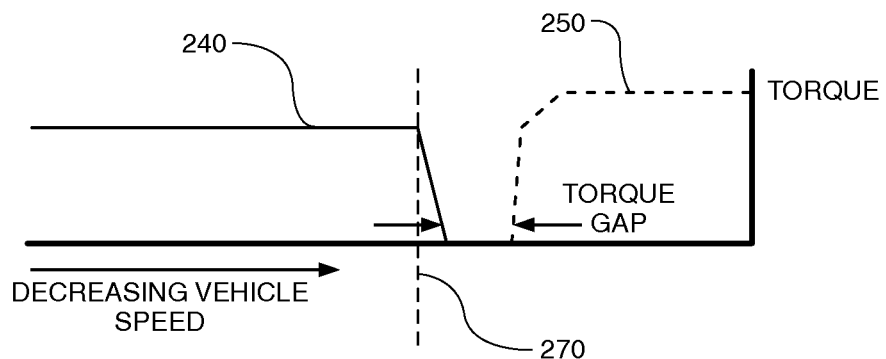
FIG. 6 is a plot illustrating a torque gap according to the current disclosure.

At low speed, it can be difficult for the electric retarding system 130 to provide sufficient retarding torque 240 to slow or stop the machine 10. FIG. 6 shows how retarding torque 240 drops to zero below a retarding threshold 270. In previous systems, the retarding system 50 might then engage the hydraulic brake system 142 that would provide braking torque 250 in order to slow or stop the machine 10. FIG. 6 shows a plot of vehicle speed on the horizontal axis (decreasing from left to right) and torque on the vertical axis. As shown in FIG. 6, the previous systems would cause a torque gap between the retarding torque 240 and the braking torque 250. The gap exists in part due to a time delay between when the hydraulic brake system 142 activates the front brake solenoid valve 144 and the rear brake solenoid valve 146, to when enough pressure is built up in the hydraulic brake pistons 148 to provide braking torque 250. The previous systems therefore produce at least two negative results. First, the torque gap allows the machine 10 to free-wheel for a period of time even though the brake pedal 150 has commanded retarding. Second, when the braking torque 250 becomes available it may be higher in magnitude than the retarding torque 240 at low speeds. The higher braking torque 250 leads to abrupt retarding of the machine 10.

Figure 7:
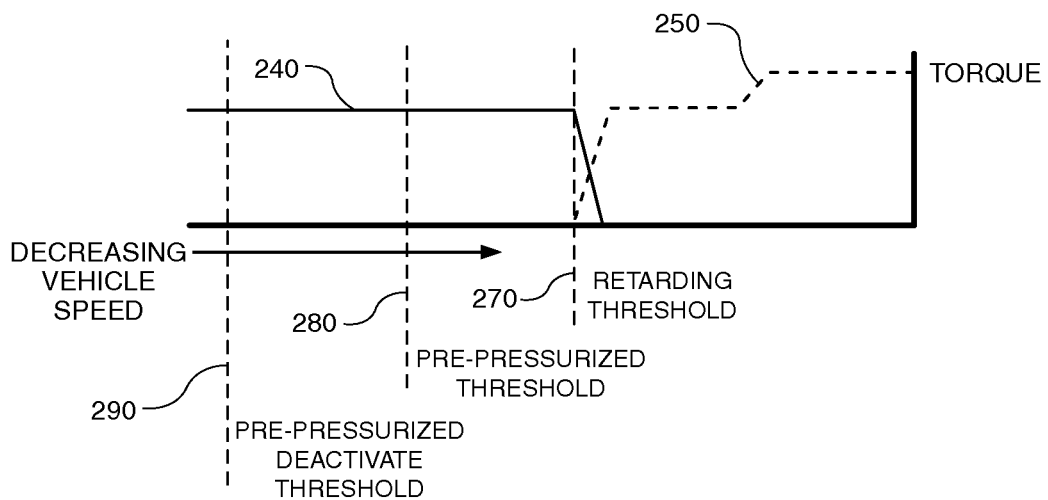
FIG. 7 is a plot illustrating blended braking torque according to the current disclosure.

One aspect of the current disclosure provides for a solution to smoothly transition between retarding torque 240 and braking torque 250 at low speeds. The system defines a retarding threshold 270, a pre-pressurize threshold 280, and a pre-pressurize deactivation threshold 290. The plot in FIG. 7 shows a plot of vehicle speed on the horizontal axis (decreasing from left to right) and torque on the vertical axis. When speed of the machine 10 drops below the pre-pressurize threshold 280, the brake ECM 132 activates front brake solenoid valve 144 and rear brake solenoid valve 146 in order to pre-pressurize the hydraulic brake pistons 148 in the front and rear friction brake system 134, 136. When the speed of the machine 10 drops below the retarding threshold 270, retarding torque 240 quickly drops to zero, while the braking torque 250 increases. There is little or no torque gap in this instance because the time delay to engage the hydraulic brake system 142 has been minimized by pre-pressurizing the front and rear friction brake systems 134, 136. If the speed of the machine 10 increases above a pre-pressurize deactivate threshold 290, pressure in the hydraulic brake system 142 is returned to normal. The pre-pressurize deactivate threshold 290 may include hysteresis with respect to the speed of the machine 10 as is known in the art.

When the speed of the machine 10 drops below the retarding threshold 270, the brake ECM 132 matches the braking torque 250 to the level previously provided by the retarding torque 240. Therefore, the retarding system 50 may provide braking torque 250 when the brake pedal 150 is in the first travel range 220 in order to replace lost retarding torque 240 capability. The brake ECM 132 uses the commanded torque from the motors 108 multiplied by the final drive ratio connected to the rear wheels 140 in order to determine the desired machine retarding torque. The brake ECM 132 then calculates the pressure that the hydraulic brake system 142 needs to supply in order to match the retarding torque 240. The pressure in the hydraulic pressure is related to braking torque 250 by an expression given by N*m/kPa*Final Drive Ratio. For example, the front friction brake system 134 may require about 35/200 N*m/kPa while the rear friction brake system 136 may require 35/200 N*m/kPa. The braking torque 250 is matched to the retarding torque 240 for a predetermined duration before command of the braking torque 250 is set equal to the desired machine retarding torque requested by brake pedal 150.

The flow chart in FIG. 8 shows how a method of blending retarding torque 240 into braking torque 250 when the machine 10 is at low speed may be implemented. First, the method starts at box 400 and proceeds to decision box 410. The method then checks to see if the desired machine retarding torque is greater than zero, i.e. the brake pedal 150 has been depressed by some degree. The method then checks to see if the speed of the machine 10 is below the pre-pressurize threshold 280. If the answer to both is YES, then the method proceeds to action box 420. Otherwise the method returns to the start box 400. At action box 420, the hydraulic brake system 142 pre-pressurizes the front friction brake system 134 and/or the rear friction brake system 136. The method then proceeds to decision box 430, where the method checks to see if the speed of machine 10 is less than the retarding threshold 270. If the answer is YES, the method proceeds to action box 440. If the answer is NO, the method returns to action box 420. At action box 440, the method sets the braking torque 250 equal to the retarding torque 240. From action box 440, the method proceeds to action box 450, where retarding torque is decreased to zero. The method then proceeds to action box 460, where braking torque 250 is set equal to the desired machine braking torque.

What is claimed is:

1. A retarding system for a machine having an electric drive system powering a set of rear wheels comprising:
   an electrical retarding system associated with the electric drive system and configured to supply a retarding torque to the rear wheels in response to a requested retarding torque;
   a hydraulic brake system configured to supply a braking torque to a set of wheels in response to a requested braking torque;
   a brake pedal having a total range of travel comprising a first range of travel and a second range of travel;
   an encoder configured to provide an output to the retarding system proportional to the total range of travel;
   wherein the first range of travel is associated with a first level of travel resistance and is configured to provide a requested retarding torque in response to the output and the second range of travel is associated with a second level of travel resistance and is configured to provide a requested braking torque and a requested retarding torque in response to the output;
   wherein the retarding system includes a sensor configured to detect a machine speed; and
   sets the braking torque equal to the retarding torque if the machine speed drops below a retarding threshold.

2. A retarding system for a machine having an electric drive system powering a set of rear wheels comprising:
   an electrical retarding system associated with the electric drive system and configured to supply a retarding torque to the rear wheels in response to a requested retarding torque;
   a hydraulic brake system configured to supply a braking torque to a set of wheels in response to a requested braking torque;
   a brake pedal having a total range of travel comprising a first range of travel and a second range of travel;
   an encoder configured to provide an output to the retarding system proportional to the total range of travel;
   wherein the first range of travel is associated with a first level of travel resistance and is configured to provide a requested retarding torque in response to the output and the second range of travel is associated with a second level of travel resistance and is configured to provide a requested braking torque and a requested retarding torque in response to the output;
   wherein the hydro-mechanical brake system comprises a hydraulic brake piston; and
   the hydraulic brake system pre-pressurizes the hydraulic brake piston with brake fluid if the machine speed drops below a pre-pressurize threshold which is higher than the retarding threshold.

3. A retarding system for a machine having an electric drive system powering a set of rear wheels comprising:
   an electrical retarding system associated with the electric drive system and configured to supply a retarding torque to the rear wheels in response to a requested retarding torque;
   a hydraulic brake system configured to supply a braking torque to a set of wheels in response to a requested braking torque;
   a brake pedal having a total range of travel comprising a first range of travel and a second range of travel;
   an encoder configured to provide an output to the retarding system proportional to the total range of travel;

wherein the first range of travel is associated with a first level of travel resistance and is configured to provide a requested retarding torque in response to the output and the second range of travel is associated with a second level of travel resistance and is configured to provide a requested braking torque and a requested retarding torque in response to the output;

wherein the brake pedal includes a second encoder configured to provide an output to the retarding system proportional to the total range of travel, wherein the retarding system, upon receiving either of the encoder outputs that is faulty, uses the other of the first or second encoder outputs to provide either of the requested braking torque or requested retarding torque.

4. A method for retarding a machine having an electric drive system powering a set of rear wheels, an electrical retarding system associated with the electric drive system and configured to supply a retarding torque to the rear wheels in response to a requested retarding torque, a hydraulic brake system configured to supply a braking torque to a set of wheels, comprising:

receiving an output from a brake pedal having a total range of travel comprising a first range of travel and a second range of travel;

supplying a retarding torque in response to an output corresponding to the first range of travel that is associated with a first level of travel resistance; and supplying a braking torque and a requested retarding torque in response to an output corresponding to the second range of travel that is associated with a second level of travel resistance, wherein the retarding system includes a sensor configured to detect a machine speed; and setting the braking torque equal to the retarding torque if the machine speed drops below a retarding threshold;

wherein the hydraulic brake system comprises a hydraulic brake piston; and pre-pressurizing the hydraulic brake piston with brake fluid from the hydraulic brake system if the machine speed drops below a pre-pressurize threshold which is higher than the retarding threshold.

5. A pedal for providing inputs to two different machine retarding systems comprising a base;

a pedal portion pivotally attached to the base and having a total range of travel;

an encoder configured to provide an electrical signal corresponding to an angle between the base and the pedal portion;

a first spring operably connected between the base and the pedal portion and having a first spring constant; and a second spring operably connected between the base and the pedal during a portion of the total range of travel and having a second spring constant, and a second encoder configured to provide an electrical signal corresponding to the angle between the base and the pedal portion.

* * * * *